(12) United States Patent
Mizoguchi

(10) Patent No.: US 8,591,374 B2
(45) Date of Patent: Nov. 26, 2013

(54) SHAFT DEVICE

(75) Inventor: Norihiro Mizoguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/700,535

(22) PCT Filed: Sep. 22, 2010

(86) PCT No.: PCT/JP2010/066373
§ 371 (c)(1),
(2), (4) Date: Nov. 28, 2012

(87) PCT Pub. No.: WO2012/039032
PCT Pub. Date: Mar. 29, 2012

(65) Prior Publication Data
US 2013/0172090 A1    Jul. 4, 2013

(51) Int. Cl.
*F16H 48/06* (2006.01)

(52) U.S. Cl.
USPC .......................................................... 475/230

(58) Field of Classification Search
USPC .................. 475/230, 220; 74/606 R
See application file for complete search history.

(56) References Cited

U.S. PATENT DOCUMENTS

| 6,618,924 B1 * | 9/2003 | Irwin .................... 29/407.05 |
| 2009/0118054 A1 * | 5/2009 | Nakajima ................... 475/230 |
| 2010/0029434 A1 * | 2/2010 | Nakajima et al. ............. 475/230 |
| 2010/0184552 A1 * | 7/2010 | Soybel et al. ................. 475/230 |
| 2010/0255948 A1 * | 10/2010 | Hewins et al. ................ 475/230 |
| 2011/0143879 A1 * | 6/2011 | Vogel et al. ................... 475/230 |

FOREIGN PATENT DOCUMENTS

| JP | A-07-167253 | 7/1995 |
| JP | A-09-026014 | 1/1997 |
| JP | A-09-089073 | 3/1997 |
| JP | A-09-089074 | 3/1997 |
| JP | A-10-141474 | 5/1998 |
| JP | A-2008-128440 | 6/2008 |
| JP | A-2009-222156 | 10/2009 |

\* cited by examiner

*Primary Examiner* — David D Le
*Assistant Examiner* — David J Hlavka
(74) *Attorney, Agent, or Firm* — Oliff & Berridge, PLC

(57) ABSTRACT

A shaft device which can ensure satisfactory lubrication for a shaft is provided. The shaft device includes a casing having a first insertion hole receiving a pin in a direction transverse to an axial direction. The shaft has a second insertion hole receiving the pin in a direction transverse to the axial direction. The pin is disposed through both the first insertion hole and the second insertion hole to fix the shaft to the casing relatively. The casing further has a space permitting the shaft to rotate in its circumferential direction with the pin partially inserted in the second insertion hole.

14 Claims, 6 Drawing Sheets ary to a shaft device including a shaft and a casing which
SHAFT DEVICE

TECHNICAL FIELD

The present invention relates to a shaft device, and particularly to a shaft device including a shaft and a casing which accommodates the shaft therein.

BACKGROUND ART

Conventionally there has been proposed a structure for a differential device mounted in an automobile or a similar vehicle. More specifically, a pinion shaft is inserted in a through hole provided in a peripheral wall of a differential casing and a pin is inserted in a pin insertion hole bored in the peripheral wall of the differential casing in a direction orthogonal to the through hole to engage the pin with the pinion shaft to fix the pinion shaft to the differential casing to prevent the pinion shaft from escaping (see Japanese Patent Laying-Open No. 2008-128440 (Patent Literature 1) for example).

CITATION LIST

Patent Literature

PTL 1: Japanese Patent Laying-Open No. 2008-128440

SUMMARY OF INVENTION

Technical Problem

An automobile differential device may have a pinion gear slid relative to a pinion shaft by right and left wheels' large differential motion, high load or the like. Accordingly, it is considered as important to be capable of constantly supplying lubricant oil between the pinion gear and the pinion shaft.

Typically a pinion shaft has only a portion of its outer circumferential surface that is opposite to the pinion gear cut to form a space between the pinion shaft and the pinion gear for supplying lubricant oil. When the pinion shaft axially moves relative to the differential casing, the oil supplying space displaces from a position at which the pinion shaft and the pinion gear are opposite to each other, resulting in reduced lubrication by oil between the pinion shaft and the pinion gear.

The present invention has been made in view of the above disadvantage, and a main object thereof is to provide a shaft device which can ensure good lubrication for a shaft.

Solution to Problem

The present invention provides a shaft device including: a casing; a shaft accommodated in the casing; and a pin that limits movement of the shaft in an axial direction. The casing has a first insertion hole receiving the pin in a direction transverse to the axial direction. The shaft has a second insertion hole receiving the pin in a direction transverse to the axial direction. The pin is disposed through both the first insertion hole and the second insertion hole to fix the shaft to the casing relatively. The casing further has a space permitting the shaft to rotate in its circumferential direction with the pin partially inserted in the second insertion hole.

In the shaft device the space may be formed as the first insertion hole has an internal wall partially recessed in a radial direction orthogonal to the axial direction.

In the shaft device the pin may be inserted in the second insertion hole in the radial direction orthogonal to the axial direction and the space may have a dimension slightly larger than that of the pin in the axial direction.

In the shaft device the pin may slide relative to the casing as the shaft rotates in its circumferential direction.

In the shaft device the shaft may be accommodated in a cylindrical accommodation hole formed in the casing and the space may have an inner diameter larger than a diameter of the accommodation hole.

In the shaft device the space may be round in geometry, as seen in the axial direction.

In the shaft device the space may share a center with the accommodation hole. In the shaft device when a running torque acts on the shaft to rotate the shaft in the circumferential direction with the pin disposed through both the first insertion hole and the second insertion hole the pin may be broken at a position radially outer than the diameter of the accommodation hole.

In the shaft device the pin may have a weak portion smaller in strength than another portion of the pin and the weak portion may be provided at a position radially outer than the diameter of the accommodation hole with the shaft accommodated in the accommodation hole and the second insertion hole having the pin inserted therein, In the shaft device the weak portion may include an indentation as the pin is machined and thus partially removed.

In the shaft device the indentation may be formed as the pin has a circumference machined and thus reduced in diameter.

In the shaft device the indentation may be in a form of a through hole penetrating the pin, In the shaft device the casing may be a casing of a differential device for a vehicle and the shaft may be a pinion shaft of the differential device and may be configured as an axis corresponding to a center of rotation of a pinion gear of the differential device.

Advantageous Effects of Invention

The present shaft device can ensure good lubrication for a shaft.

DESCRIPTION OF EMBODIMENTS

Hereinafter reference will be made to the drawings to describe the present invention in embodiments. In the figures, identical or corresponding components are identically denoted and will not be described repeatedly.

First Embodiment

Figure 1:
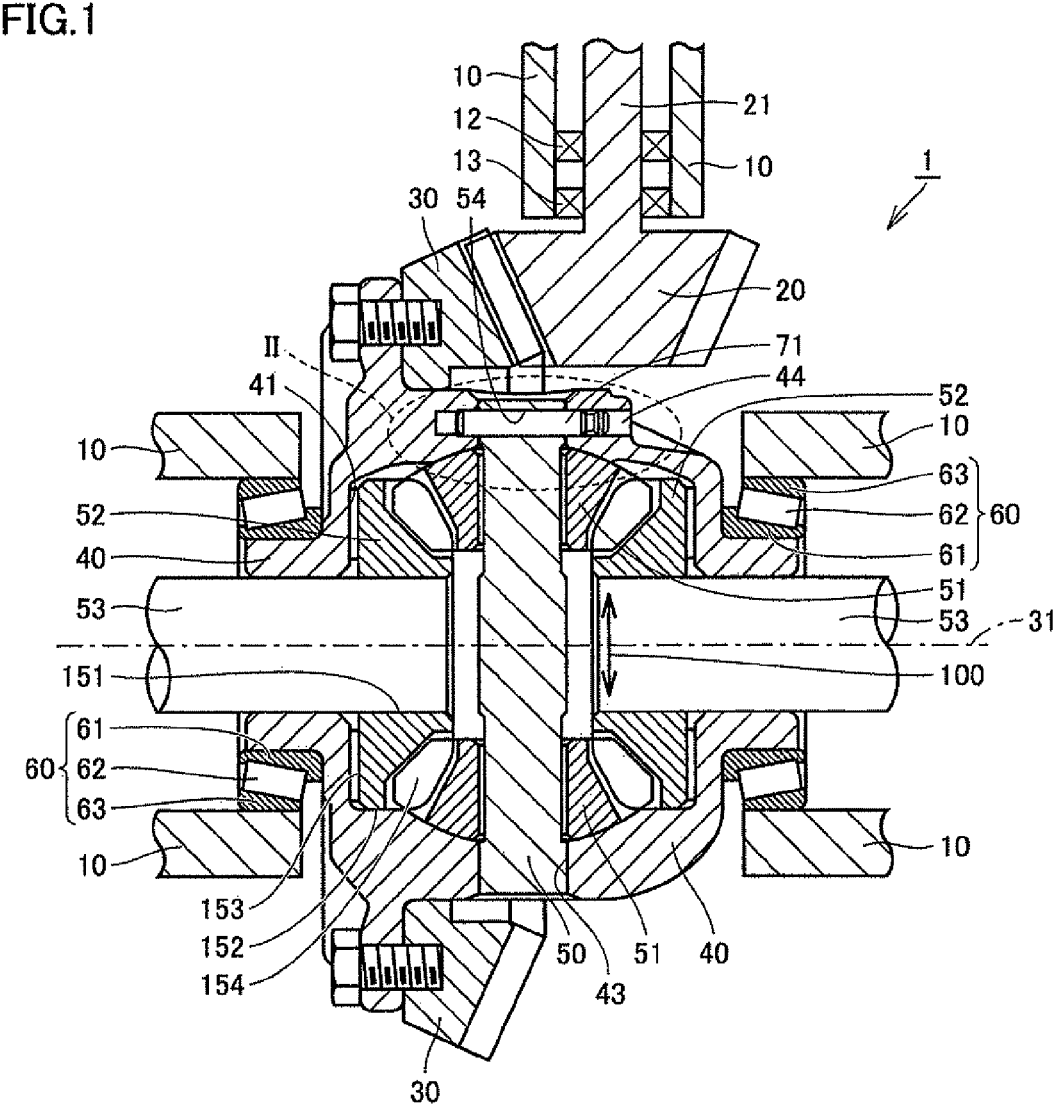
FIG. 1 is a cross section of a differential device in accordance with a first embodiment of the present invention.

FIG. 1 is a cross section of a differential device 1 in accordance with a first embodiment of the present invention. Differential device 1 receives torque from a driving force source, and transmits a portion thereof to right and left wheels via a drive shaft 53. Differential device 1 is accommodated in a differential carrier 10.

Differential carrier 10 is in the form of a box and internally has a space for accommodating parts. In differential carrier 10, oil exists, and this oil cools and lubricates various mechanisms of differential device 1.

Differential carrier 10 holds a drive pinion 20. Drive pinion 20 is integral with an input shaft 21 and held rotatably. Input shaft 21 is held by differential carrier 10 via bearings 12 and 13 and can thus rotate drive pinion 20.

Drive pinion 20 meshes with a ring gear 30. Ring gear 30 has a portion immersed in the oil in differential carrier 10, and as ring gear 30 rotates, it can scoop up the oil. Ring gear 30 and drive pinion 20 mesh such that they may have a predetermined backlash.

A differential casing 40 is connected to ring gear 30. Ring gear 30 is bolted to differential casing 40 and held by differential casing 40. The driving force source generates power, which has its driving force, rotation speed and rotation direction converted by a transmission and is transmitted via drive pinion 20 and ring gear 30 to differential casing 40.

Differential casing 40 holds a pinion shaft 50. Differential casing 40 is provided with an accommodation hole 43. Pinion shaft 50 is inserted in accommodation hole 43 and thus accommodated therein. Differential casing 40 is provided with an insertion hole 44 for receiving a pin 71. Pinion shaft 50 is provided with an insertion hole 54 for receiving pin 71. Pin 71 disposed in insertion holes 44 and 54 holds pinion shaft 50 in differential casing 40.

Pinion shaft 50 extends in an axial direction 100 indicated in FIG. 1 by a double headed arrow. Pinion shaft 50 holds a pinion gear 51 rotatably and revolvably. A pair of side gears 52 is disposed to mesh with pinion gear 51. Side gear 52 is fitted to drive shaft 53 via a spline and thus has its rotation transmitted to drive shaft 53.

Drive shaft 53 rotates with differential casing 40. Differential casing 40 is provided such that it shares a virtual line corresponding to a center of rotation, or an axis of rotation 31, with drive shaft 53. Drive shaft 53 is provided to be rotatable about axis of rotation 31, and differential carrier 10 is fixed. That is, drive shaft 53 is provided to capable of rotating about axis of rotation 31 relative to differential carrier 10 surrounding drive shaft 53.

Differential casing 40 is rotatably held by differential carrier 10 via a bearing 60. Bearing 60 has an inner race 61 in contact with differential casing 40, an outer race 63 in contact with differential carrier 10, and a roller 62 as a rolling element posed between inner race 61 and outer race 63.

Side gear 52 has a flat thrust surface 153 orthogonal to axis of rotation 31, a through hole 151 located radially inwardly of thrust surface 153 and serving as an inner surface, an outer surface 152 located radially outwardly of thrust surface 153, and a tooth flank 154 that meshes with the pinion gear. Outer surface 152 is a cylindrical surface and disposed parallel to axis of rotation 31. Outer surface 152 is in contact with an inner surface 41 of differential casing 40. The differential casing 40 inner surface 41 with which outer surface 152 is in contact is also configured to be parallel to axis of rotation 31.

Drive shaft 53 is fitted in through hole 151 provided in side gear 52, and drive shaft 53 and side gear 52 rotate together. Thrust surface 153 extends from through hole 151 to outer surface 152 and is orthogonal to axis of rotation 31. Thrust surface 153 is configured by a flat plane without a portion projecting along axis of rotation 31. Tooth flank 154 extends linearly. Tooth flank 154 is located on a conical surface and configured to be smaller in diameter as it is farther away from thrust surface 153. Note that side gear 52 may have tooth flank 154 twisted, i.e., a so-called spiral gear.

A differential gear which provides rotation difference between right and left drive shafts 53 to allow a vehicle to travel smoothly when the vehicle turns around, travels on a rough road or the like, is configured of pinion gear 51 and side gear 52. Pinion gear 51 is attached to differential casing 40 and side gear 52 meshes with pinion gear 51. Furthermore, side gear 52 is coupled with drive shaft 53 via a spline.

When a vehicle travels a flat road straightforward, its right and left driving wheels travel equal distances, respectively. Accordingly, right and left side gears 52 rotate at equal speeds, respectively, and pinion gear 51 posed between side gears 52 does not rotate, and differential casing 40, pinion gear 51 and side gear 52 revolve together.

When a vehicle travels on a curve, a driving wheel outer than the curve travels a distance larger than that inner than the curve does, and accordingly, side gear 52 outer than the curve rotates faster than side gear 52 inner than the curve. In doing so, side gear 52 outer than the curve rotates faster than differential casing 40 and side gear 52 inner than the curve rotates more slowly than differential casing 40. Accordingly, pinion gear 51 attached to differential casing 40 and posed between right and left side gears 52 will not only revolve but also rotate. This allows the power received from differential casing 40 to be transmitted to right and left side gears 52 rotating at different speeds.

This operation of the differential gear allows the vehicle to smoothly travel on a curve, a rough road or the like without a driving wheel slipping on the road.

Hereinafter, the shaft device according to the present embodiment will be described. The shaft device includes a casing and a shaft accommodated in the casing. The easing in the present embodiment is differential casing 40 of differential device 1 for a vehicle, and the shaft is pinion shaft 50 of differential device 1. Pinion shaft 50 is configured as an axis corresponding to the center of rotation of pinion gear 51 of differential device 1.

Figure 2:
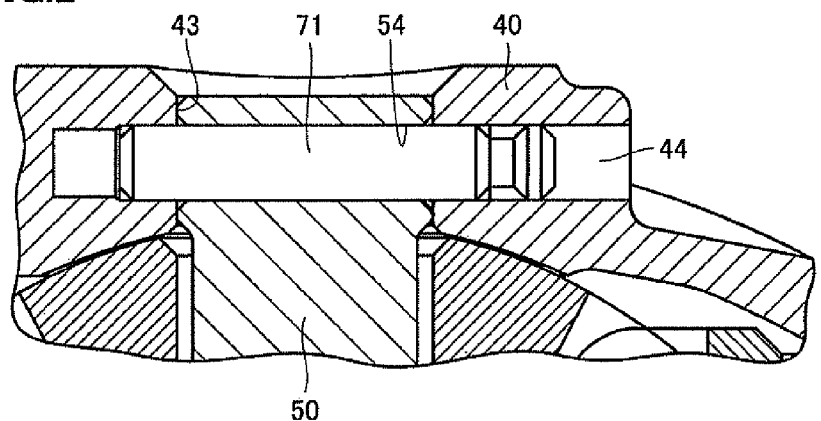
FIG. 2 is a partial cross sectional view of the differential device, as enlarged in a vicinity of a region II shown in FIG. 1.
Figure 3:
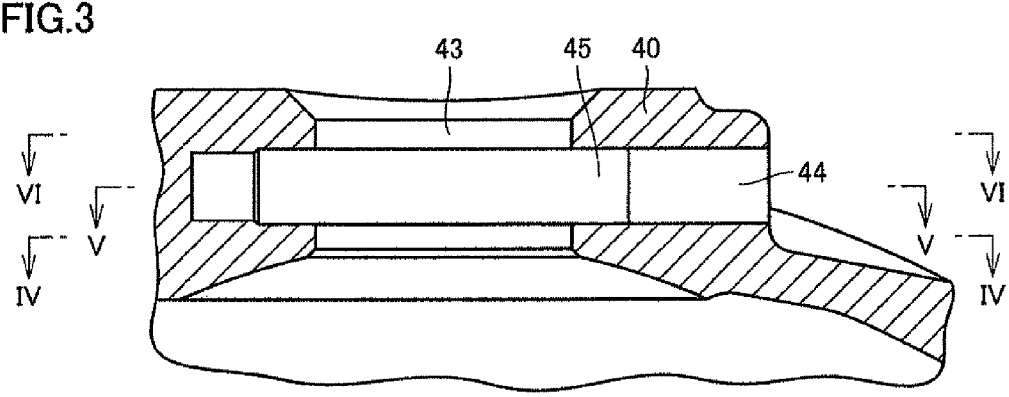
FIG. 3 is a cross section showing a configuration of an insertion hole provided to a differential casing.
Figure 4:
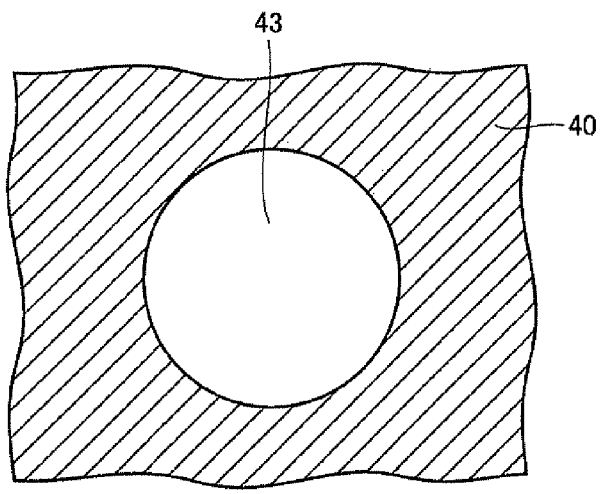
FIG. 4 is a cross section of the differential casing taken along a line IV-IV shown in FIG. 3.
Figure 5:
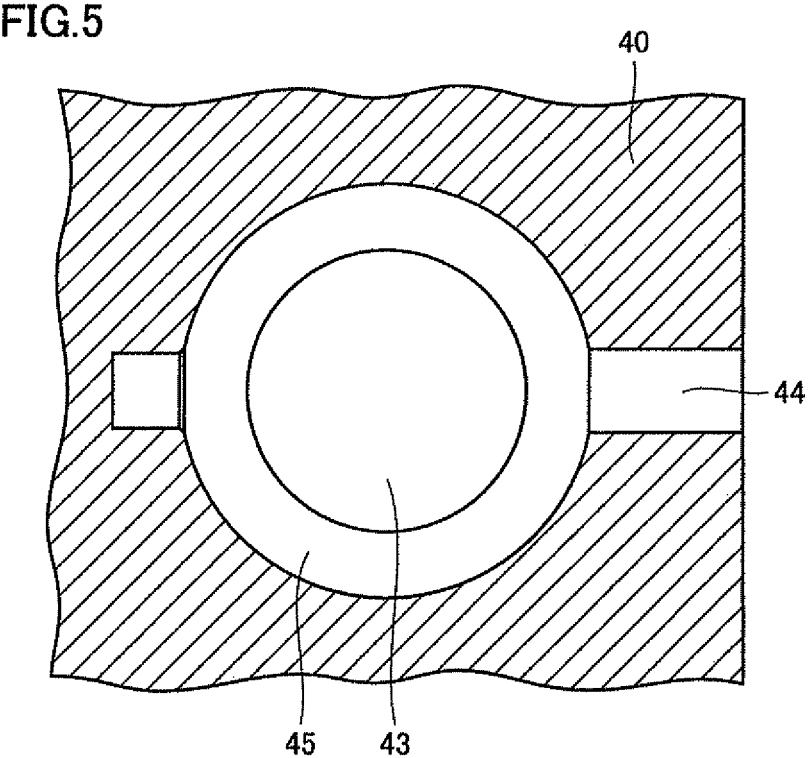
FIG. 5 is a cross section of the differential casing taken along a line V-V shown in FIG. 3.
Figure 6:
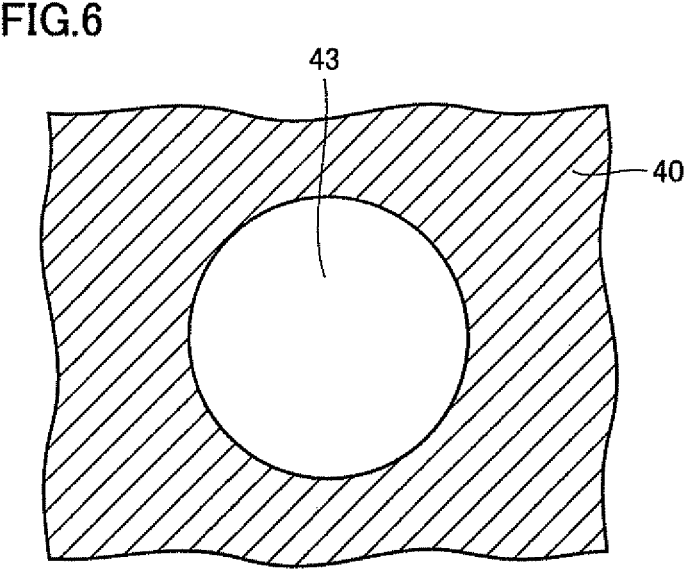
FIG. 6 is a cross section of the differential casing taken along a line VI-VI shown in FIG. 3.

FIG. 2 is a partial cross section of differential device 1, as enlarged in a vicinity of a region II shown in FIG. 1. FIG. 3 is a cross section showing a configuration of insertion hole 44 provided to differential casing 40. FIG. 4 is a cross section of differential casing 40 taken along a line IV-IV in FIG. 3. FIG. 5 is a cross section of differential casing 40 taken along a line V-V in FIG. 3. FIG. 6 is a cross section of differential casing 40 taken along a line VI-VI in FIG. 3.

With reference to FIG. 2 to FIG. 6, as required, differential casing 40 has insertion hole 44 as a first insertion hole to receive pin 71. Pinion shaft 50 is formed generally in the form of a cylinder and accommodated in cylindrical accommodation hole 43 provided in differential casing 40. Pinion shaft 50 has insertion hole 54 as a second insertion hole to receive pin 71. Insertion holes 44 and 54 are formed to extend in a direction transverse to axial direction 100 shown in FIG. 1, typically a direction orthogonal to axial direction 100.

Pin 71 is inserted in insertion holes 44 and 54 in a radial direction orthogonal to axial direction 100. Pin 71 is inserted and disposed in insertion hole 44 and insertion hole 54 to extend through both insertion hole 44 and insertion hole 54. Pin 71 disposed through both insertion hole 44 and insertion hole 54 fixes pinion shaft 50 to differential casing 40 relatively. Pin 71 inserted in insertion hole 44 and insertion hole 54 limits movement of pinion shaft 50 relative to differential casing 40 in axial direction 100 and also limits circumferential, rotational movement of cylindrical pinion shaft 50.

Insertion hole 54 formed in pinion shaft 50 is formed as a through hole which penetrates pinion shaft 50 in a direction transverse to axial direction 100. Insertion hole 54 penetrates cylindrical pinion shaft 50 radially. Insertion hole 54 is bored in pinion shaft 50 across the center axis of cylindrical pinion shaft 50. Insertion hole 54 extends in a direction transverse to the center axis of pinion shaft 50. Typically, insertion hole 54 extends in a direction orthogonal to the center axis of pinion shaft 50.

Differential casing 40 also has a space 45. As clearly shown in FIG. 5 in particular, space 45 is round in geometry, as seen in axial direction 100. The round geometry of space 45 shares a center with cylindrical accommodation hole 43. A direction perpendicular to the plane of the drawing of FIG. 5 corresponds to axial direction 100 shown in FIG. 1, and space 45 and accommodation hole 43 as seen in axial direction 100 form concentric circles as seen in a plane. As seen in axial direction 100, accommodation hole 43 and space 45 are formed in differential casing 40 in concentric circles. Space 45 has an inner diameter larger than the diameter of accommodation hole 43.

With reference to FIG. 3 and FIG. 5, space 45 as seen in axial direction 100 shown as a vertical direction in FIG. 3 has a dimension smaller than its diameter as seen in a radial direction orthogonal to axial direction 100. Space 45 is provided in the form of a disk. With reference to FIG. 2 and FIG. 3, the disk that space 45 forms has a dimension as seen depthwise (i.e., a dimension in axial direction 100) slightly larger than that of pin 71 as seen in axial direction 100.

As shown in FIG. 5, space 45 is formed by expanding a portion of an internal space of insertion hole 44 in a radial direction orthogonal to axial direction 100 to radially recess a portion of an internal wall of insertion hole 44 receiving pin 71 for limiting movement of pinion shaft 50. Pin 71 is generally cylindrical with a round end face. Insertion hole 44 for receiving pin 71 also has a cylindrical internal wall. Space 45 is formed by working differential casing 40 so that a hollow space in the form of a semicircular disk projects in two directions (a vertical direction in FIG. 5) orthogonal to a direction in which insertion hole 44 extends (a horizontal direction in FIG. 5).

Figure 7:
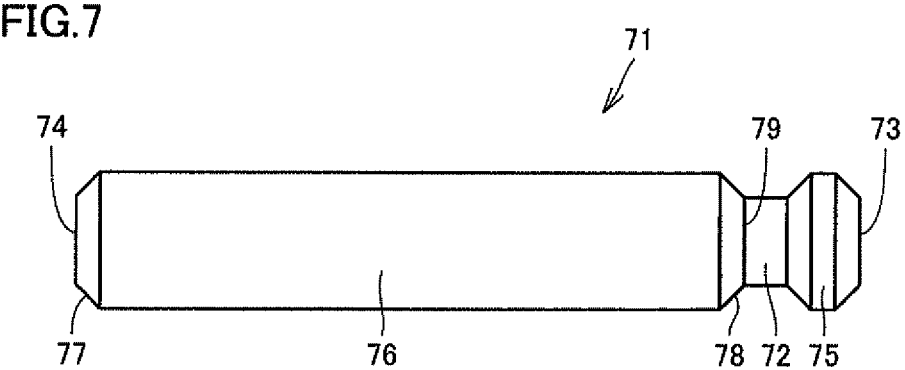
FIG. 7 is a side view showing a configuration of a pin in detail.

FIG. 7 is a side view showing a configuration of pin 71 in detail. Pin 71 is generally cylindrical in geometry. Pin 71 has a flat round tip 73 forming one end of pin 71 and a flat round tip 74 forming the other end of pin 71. Pin 71 has an indentation 72. More specifically, pin 71 has a portion adjacent to tip 73 machined circumferentially and thus removed to have a reduced diameter. Indentation 72 has a diameter smaller than the remainder of pin 71 and thus forms a weak portion smaller in strength than the remainder of pin 71.

Pin 71 has a head 75 closer to tip 73 than indentation 72, and a body 76 closer to tip 74 than indentation 72. Head 75, indentation 72, and body 76 each have a cylindrical surface. An end of body 76 closer to tip 73 has a taper 78. At taper 78, pin 71 has its external surface gradually reduced in diameter toward indentation 72 smaller in diameter than body 76. An end of body 76 closer to tip 74 also has a similar taper 77, at which pin 71 has its external surface gradually reduced in diameter toward tip 74 smaller in diameter than body 76.

Head 75 of pin 71, provided in the form of a rod, as seen in a direction in which pin 71 extends has a dimension smaller than that of body 76 thereof. Pin 71 as seen in the direction in which it extends has head 75 and body 76 with their respective dimensions at a ratio, which can be adjusted by the position of indentation 72. For example, a distance from an annular boundary 79 which forms a boundary between indentation 72 and taper 78 to tip 73 of pin 71 and a distance from boundary 79 to the other tip 74 of pin 71 may have a ratio of 1:6. The ratio is not limited to thereto, and pin 71 as seen in the direction in which it extends may have head 75 and body 76 at any dimensional ratio that allows pin 71 assembled to pinion shaft 50 to have indentation 72 positioned outside the pinion shaft 50 insertion hole 54.

Indentation 72 has sufficiently small strength as compared with the remainder of pin 71 to such an extent that it breaks most easily when pin 71 experiences shearing stress. To reduce indentation 72 in strength, reducing indentation 72 to be smaller in diameter than the remainder of pin 71 suffices. In contrast, when differential device 1 normally operates, indentation 72 is required to have strength to avoid breaking. For example, indentation 72 is required to have a strength that prevents pin 71 from being broken by a torque acting on pinion shaft 50 by a friction drag caused between pinion gear 51 and pinion shaft 50 when pinion gear 51 and pinion shaft 50 are normally lubricated therebetween and that allows pin 71 to be broken only when a portion of pinion gear 51 and that of pinion shaft 50 which slide on one another have been seized up. To obtain such strength, pin 71 may be worked to form indentation 72 for example to have a diameter of two thirds of that of head 75 and body 76.

Pin 71 preferably has indentation 72 at a position, as seen in the direction in which pin 71 extends, closer to tip 74 in terms of the pin's strength. In contrast, indentation 72 positionally closer to tip 73 is advantageous in preventing pinion shaft 50 from escaping, as will be described hereinafter.

Figure 8:
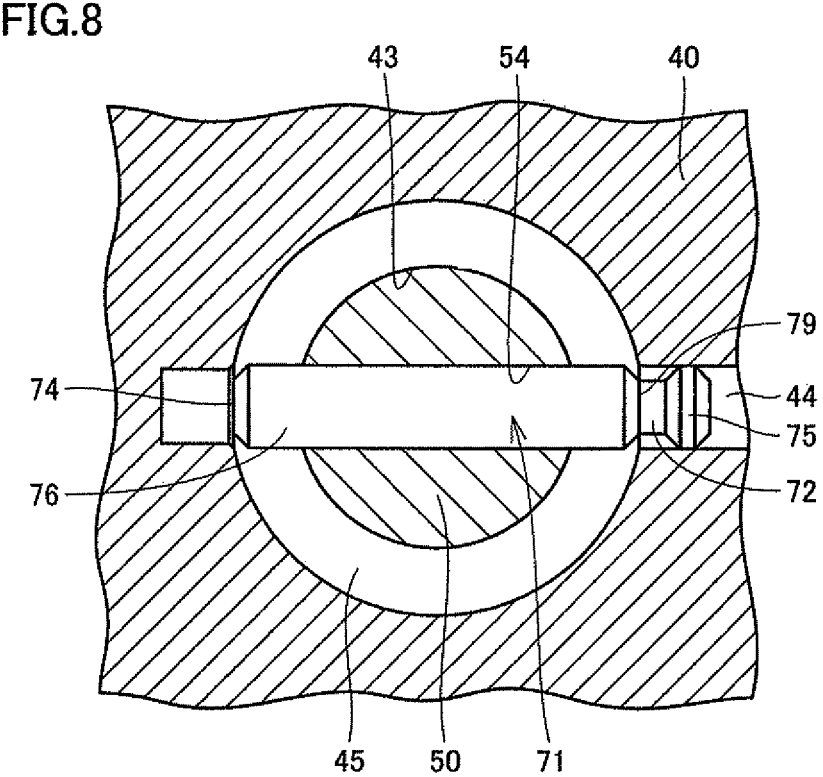
FIG. 8 is a cross section showing the differential casing and the pinion shaft with their respective insertion holes having received the pin.

Space 45 and pin 71 thus configured can prevent pinion shaft 50 from moving relative to differential casing 40 in axial direction 100 in a principle, as will be described hereinafter. FIG. 8 is a cross section showing differential casing 40 and pinion shaft 50 with their respective insertion holes 44 and 54 having received pin 71. FIG. 8 shows differential casing 40 with accommodation hole 43 having pinion shaft 50 accommodated therein and insertion hole 44 having received pin 71 therein via an opening allowing insertion hole 44 to externally open, and pinion shaft 50 with insertion hole 54 having received pin 71 therein.

In the FIG. 8 condition, pin 71 is disposed to pass through insertion hole 54 formed through pinion shaft 50. Pin 71 has a portion from head 75 to indentation 72 held in the differential casing 40 insertion hole 44 and the pin 71 body 76 penetrates pinion shaft 50 in space 45. The pin 71 body 76 has a length, as seen in the direction in which pin 71 extends, substantially equal to the diameter of space 45 in the form of a disk. That is, as shown in FIG. 8, the length of pin 71 from tip 74 to boundary 79 is substantially equal to the diameter of space 45.

Furthermore, in the FIG. 8 condition, pin 71 has indentation 72 at a position radially outer than the diameter of cylindrical accommodation hole 43 accommodating pinion shaft 50 therein. Pin 71 is disposed through both the differential casing 40 insertion hole 44 and the pinion shaft 50 insertion hole 54 and indentation 72 is disposed in insertion hole 44. Indentation 72 is disposed at a position that has a distance from the axis of accommodation hole 43 larger than the inner surface of cylindrical accommodation hole 43, and is disposed radially outwardly of the inner surface of accommodation hole 43.

It is desirable that insertion hole 44, space 45 and pin 71 be formed to allow pin 71 completely inserted in insertion holes 44 and 54, as shown in FIG. 8, to have indentation 72 positioned as intended. For example, when pin 71 is pressed and thus fitted into insertion holes 44 and 54, pin 71 may be positioned as its tip 74 abuts against a wall surface of space 45. When pin 71 is pressed and thus fitted in, indentation 72 can also be concurrently, easily positioned. This ensures that pin 71 experiencing shearing stress is broken at indentation 72.

Figure 9:
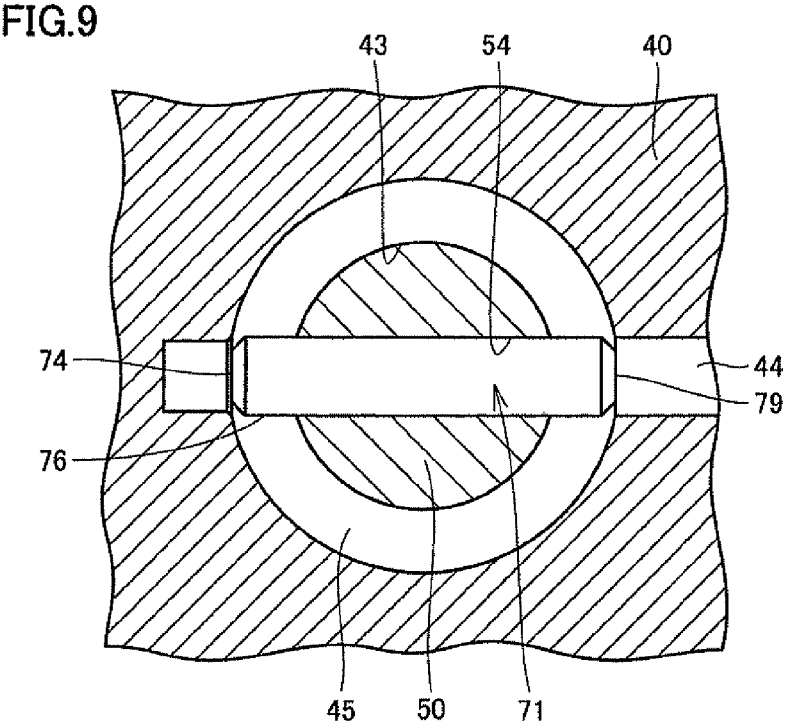
FIG. 9 is a cross section showing the pin broken.

FIG. 9 is a cross section showing pin 71 broken. For differential device 1 for a vehicle, when the vehicle's right and left wheels experience large differential motion, high load or the like resulting in increased sliding resistance between pinion gear 51 and pinion shaft 50, a large running torque acts on pinion shaft 50 to rotate pinion shaft 50 in its circumferential direction.

This running torque causes a shearing stress to act on pin 71, which has a function to stop pinion shaft 50 from rotating, to bend pin 71. With the pin 71 head 75 in the differential casing 40 insertion hole 44, when pinion shaft 50 is going to rotate relative to differential casing 40, pin 71 is also going to rotate with pinion shaft 50 and thus presses a wall surface of insertion hole 44 and causes a stress, and a reaction thereto causes a stress to act on head 75 from differential casing 40.

Pin 71 will be broken when the stress that acts on pin 71 from differential casing 40 exceeds the proof stress of pin 71, Pin 71 is broken at indentation 72 forming a weak portion smallest in strength. As has been set forth above, pin 71 has indentation 72, at which pin 71 starts to be broken, at a position radially outer than the diameter of cylindrical accommodation hole 43 accommodating pinion shaft 50 therein. Accordingly, with indentation 72 serving as a point at which pin 71 starts to be broken, pin 71 is broken at a position radially outer than the diameter of cylindrical accommodation hole 43.

FIG. 9 shows pin 71 broken and thus having body 76 left in space 45. After pin 71 is broken, pin 71 has body 76 disposed through the pinion shaft 50 insertion hole 54, and an end of body 76 closer to tip 74 and that of body 76 closer to boundary 79 are both outside insertion hole 54. Pin 71 thus broken has a portion in insertion hole 54 and another portion projecting therefrom outside pinion shaft 50 and extending radially outwardly of the diameter of accommodation hole 43.

In the FIG. 9 condition, pin 71 having a function to stop pinion shaft 50 from rotating has its length reduced and thus allows pinion shaft 50 to rotate in its circumferential direction. With pin 71 broken at indentation 72, pinion shaft 50 is accommodated in accommodation hole 43 rotatably relative to differential casing 40.

Figure 10:
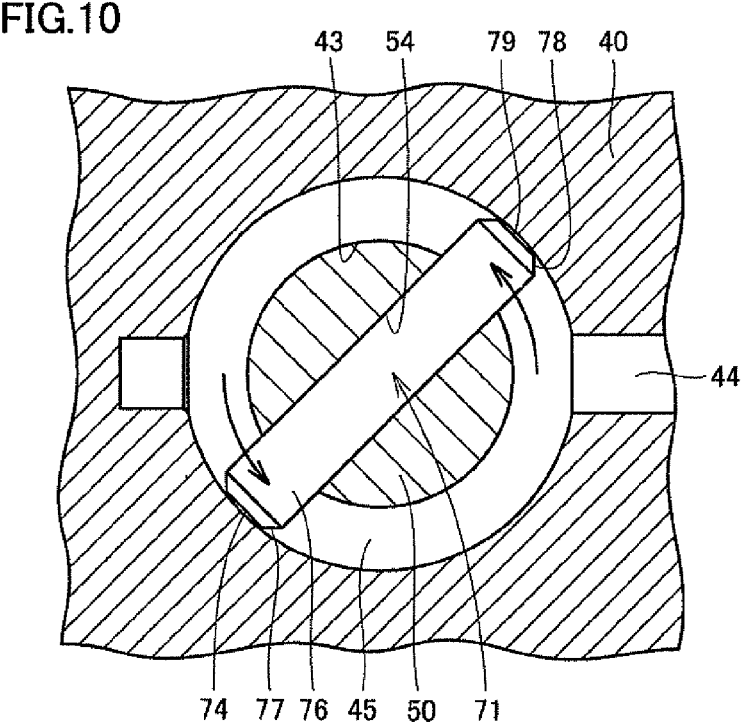
FIG. 10 is a cross section showing the pin rotating with the pinion shaft.

FIG. 10 is a cross section showing pin 71 rotating with pinion shaft 50. Space 45 formed in differential casing 40 permits pinion shaft 50 to rotate in its circumferential direction with pin 71 partially inserted in insertion hole 54. Space 45 is formed so as to avoid preventing pin 71 from moving relative to differential casing 40 when pinion shaft 50 rotates in its circumferential direction relative to differential casing 40 with pin 71 partially inserted in insertion hole 54. Space 45 is formed by boring and thus partially removing differential casing 40 so as to avoid interfering with a passage of pin 71 rotating with pinion shaft 50 relative to differential casing 40.

Accordingly, as shown in FIG. 10, by a running torque which acts on pinion shaft 50, pinion shaft 50 and pin 71 rotate together relative to differential casing 40. Pin 71 slides relative to differential easing 40 as pinion shaft 50 rotates in its circumferential direction. Pin 71 rotates with pinion shaft 50 in such a condition that pin 71 partially projects to space 45 having an inner diameter larger than the diameter of accommodation hole 43 having pinion shaft 50 accommodated therein and pin 71 has an end projecting out of pinion shaft 50 radially outwardly of the diameter of accommodation hole 43.

Pin 71 rotating in space 45 with pinion shaft 50 limits movement of pinion shaft 50 in a direction in which pinion shaft 50 escapes from differential casing 40, i.e., in axial direction 100 shown in FIG. 1. Pin 71 that rotates in space 45 formed in differential casing 40 can avoid further breakage when it rotates, and pin 71 that has a length extending radially outwardly of the diameter of accommodation hole 43 having pinion shaft 50 accommodated therein can limit movement of pinion shaft 50 in axial direction 100.

Thus, even if pinion shaft 50 accommodated in differential casing 40 rotates, differential casing 40 and pinion shaft 50 can be prevented from having their relative positions varied in axial direction 100. Accordingly, pinion shaft 50 can be disposed so that the oil supplying space formed at the external, circumferential surface of pinion shaft 50 may be posed between pinion shaft 50 and pinion gear 51, and satisfactory lubrication is ensured for pinion shaft 50.

The device of the first embodiment described above has differential casing 40 having space 45 to permit pinion shaft 50 to rotate in its circumferential direction with pin 71 partially inserted in the pinion shaft 50 insertion hole 54. Pin 71 rotates with pinion shaft 50 relative to differential casing 40 in such a condition that pin 71 has a portion inserted in insertion hole 54 and another portion disposed outside insertion hole 54. A portion of pin 71 that projects outside insertion hole 54 prevents pinion shaft 50 from moving in axial direction 100 relative to differential casing 40.

Accordingly, even if pinion shaft 50 rotates relative to differential casing 40 and pin 71 is broken, the movement of pinion shaft 50 relative to differential casing 40 in axial direction 100 can be limited. Accordingly, a lubricant oil supplying space can be disposed between pinion gear 51 and pinion shaft 50, and satisfactory lubrication can be ensured for pinion shaft 50. When pin 71 is broken, pinion shaft 50 can still be prevented from relatively moving in the axial direction, and pinion shaft 50 can also be prevented from escaping from differential casing 40.

Furthermore, space 45 is formed as differential casing 40 has insertion hole 44 with an internal wall partially recessed in a radial direction orthogonal to axial direction 100. This allows space 45 to be formed simply by working a portion of an internal space of insertion hole 44 to increase a radial dimension of a portion of insertion hole 44.

Pin 71 is inserted in insertion hole 54 in a radial direction orthogonal to axial direction 100 and space 45 has a dimension in axial direction 100 slightly larger than that of pin 71 in axial direction 100. If space 45 has an extremely small dimension in axial direction 100, pin 71 will be press-fitted in space 45 and thus undesirably prevented from moving therein. In contrast, if space 45 has an extremely large dimension in axial direction 100, pin 71 will clatter in space 45 and thus cause noise. Accordingly, it is desirable that space 45 has a dimension slightly larger than that of pin 71 in axial direction 100.

Space 45 and pin 71 having their dimensions set in axial direction 100 to allow pin 71 to slide in space 45 relative to differential casing 40 as pinion shaft 50 rotates are more preferable, as such allows pin 71 to move in space 45 smoothly and can also prevent noise preferably.

Pinion shaft 50 is accommodated in cylindrical accommodation hole 43 provided to differential casing 40 and space 45 has an inner diameter larger than the diameter of accommodation hole 43. This allows pin 71 to be partially disposed in space 45 having an inner diameter larger than the diameter of accommodation hole 43, and pin 71 rotated with pinion shaft 50 relative to differential casing 40 ensures that pin 71 has a function to limit movement of pinion shaft 50 in axial direction 100.

Furthermore, space 45 is round in geometry, as seen in axial direction 100. This can facilitate working space 45 and thus increase the device's productivity. In doing so, forming space 45 and accommodation hole 43 concentrically ensures that space 45 is formed to be radially outer than the diameter of accommodation hole 43.

Furthermore, when a running torque acts on pinion shaft 50 to rotate pinion shaft 50 in its circumferential direction with pin 71 disposed through both insertion holes 44 and 54, pin 71 is broken at a position radially outer than the diameter of cylindrical accommodation hole 43. Pin 71 disposed through both insertion hole 44 and insertion hole 54 limits movement of pinion shaft 50 in axial direction 100 and also has a function to stop pinion shaft 50 from rotating. After pin 71 is broken, pin 71 can continue to limit movement of pinion shaft 50 in axial direction 100 and also rotate with pinion shaft 50.

If pin 71 does not have a function to stop pinion shaft 50 from rotating, then, when differential device 1 normally operates, pin 71 and pinion shaft 50 rotate together. Accordingly, pin 71 and pinion shaft 50 require lubrication, however, differential device 1 in a conventional structure cannot provide sufficient lubrication and at an early stage pin 71 per se would be seized up and may be unable to fulfill a function to prevent pin 71 from escaping, as desired. Preventing this requires a modified lubrication structure and hence a major structural modification resulting in an increased cost. Pin 71 that has the function to stop pinion shaft 50 from rotating can eliminate the necessity of introducing a modified lubrication structure and thus avoid an increased cost for the device.

Furthermore, pin 71 has a weak portion smaller in strength than the remainder of pin 71, and the weak portion is provided at a position radially outer than the diameter of accommodation hole 43 with pinion shaft 50 accommodated in accommodation hole 43 and insertion hole 54 having pin 71 inserted therein. This allows pin 71 to have a breaking point defined by the weak portion and ensures that pin 71 broken has a portion disposed to be radially outer than accommodation hole 43 and that pin 71 has a function to limit movement of pinion shaft 50 in axial direction 100.

Furthermore, the weak portion includes an indentation as pin 71 is machined and thus partially removed. This facilitates forming the weak portion and also ensures that the weak portion is formed at the same position of pin 71. Pin 71 having a circumference machined and thus reduced in diameter to have indentation 72 can be provided simply by a conventional method represented by cutting.

Second Embodiment

Figure 11:
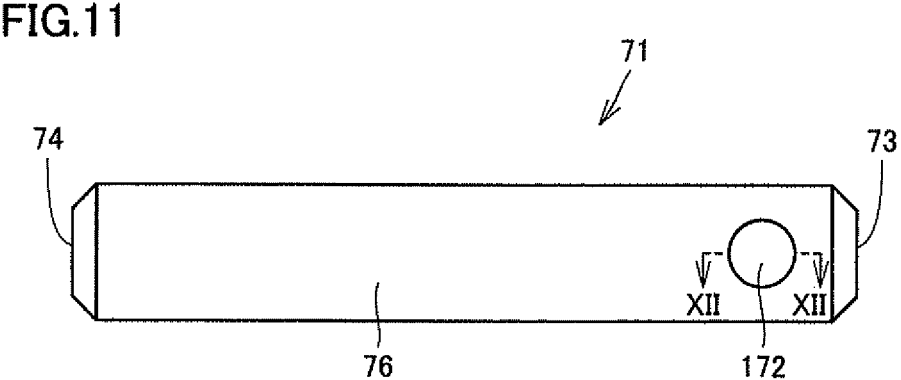
FIG. 11 is a side view showing a configuration of a pin of a second embodiment in detail.
Figure 12:
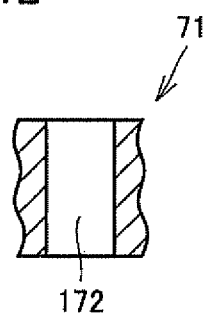
FIG. 12 is a cross section of the pin taken along a line XII-XII shown in FIG. 11.

FIG. 11 is a side view showing a configuration of pin 71 in a second embodiment in detail. FIG. 12 is a cross section of pin 71 along a line XII-XII line in FIG. 11. The second embodiment provides pin 71 that, in contrast to the first embodiment, has an indentation 172 adjacent to tip 73 in the form of a through hole penetrating pin 71. Indentation 172 is a round hole and formed in a radial direction of pin 71 to have a center transverse to the axis of pin 71. Indentation 172 extends in a direction transverse to a direction in which pin 71 extends, typically in a direction orthogonal thereto, and indentation 172 penetrates pin 71.

Indentation 172 allows pin 71 to be broken, similarly as described in the first embodiment, and pin 71 can be disposed through both insertion hole 44 and insertion hole 54 to prevent pinion shaft 50 from escaping and rotating and after pin 71 is broken pin 71 can still prevent pinion shaft 50 from moving in axial direction 100 while pin 71 can rotate with pinion shaft 50.

Round indentation 172 can be formed for example by drilling and thus boring pin 71. While indentation 72 of the first embodiment is better in workability, pin 71 with indentation 172 in the form of a through hole can have a more cylindrical circumferential surface. This can reduce the possibility that pin 71 being inserted to insertion holes 44 and 54 has the indentation caught by the holes, which can facilitate inserting pin 71 to insertion holes 44 and 54 and thus increase workability in assembling the device.

Third Embodiment

Figure 13:
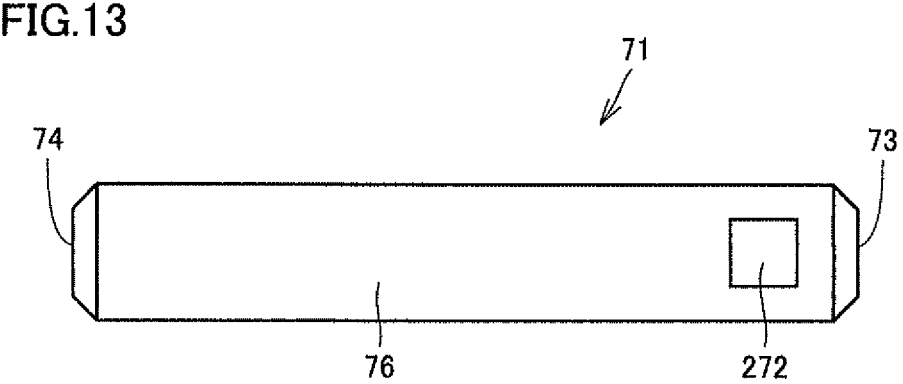
FIG. 13 is a side view showing a configuration of a pin of a third embodiment in detail.

FIG. 13 is a side view specifically showing a configuration of pin 71 in a third embodiment. The third embodiment provides pin 71 that, in contrast to the second embodiment, has an indentation 272 adjacent to tip 73 in the form of a square through hole penetrating pin 71. Indentation 272 is formed in the radial direction of pin 71 such that the center of the square as seen in the hole's depthwise direction is transverse to the axis of pin 71.

Indentation 272 allows pin 71 to be broken, similarly as described in the first embodiment, and pin 71 can be disposed through both insertion hole 44 and insertion hole 54 to prevent pinion shaft 50 from escaping and rotating and after pin 71 is broken pin 71 can still prevent pinion shaft 50 from moving in axial direction 100 while pin 71 can rotate with pinion shaft 50.

While round indentation 172 of the second embodiment is better in workability, pin 71 with indentation 272 in the form of a square hole allows stress concentration to occur at a corner when shearing stress acts on pin 71, which can facilitate breaking pin 71.

Note that in the first to third embodiments, pinion shaft 50 has insertion hole 54 in the form of a through hole penetrating pinion shaft 50. However, insertion hole 54 may not be limited to the through hole, and may be a bottomed hole. This example also allows pin 71 to have one end inserted in insertion hole 54 and the other end outside insertion hole 54 and to be disposed to project radially outwardly of the diameter of the accommodation hole that has pinion shaft 50 accommodated therein to similarly prevent pinion shaft 50 from moving in axial direction 100.

Furthermore, although insertion hole 54 has been described as a hole which extends in the radial direction of cylindrical pinion shaft 50 and insertion hole 44 of differential casing 40 has been described as a hole which extends in the radial direction of cylindrical accommodation hole 43 by way of example, they are not limited thereto. Differential casing 40 may have space 45 in any geometry that does not prevent pin 71 from rotating with pinion shaft 50, with pin 71 extending in a direction transverse to the axial direction of pinion shaft 50, as has been described above. Pinion shaft 50 can similarly effectively be prevented from moving in axial direction 100. That is, insertion holes 44 and 54 are not limited to the direction orthogonal to axial direction 100 and may be formed to extend in any direction transverse to axial direction 100.

Furthermore, space 45 formed in differential casing 40 is not limited in geometry to the form of a disk as described above. For example, space 45 may be a truncated cone for example if pin 71 is inserted to pinion shaft 50 in a direction forming an acute angle with axial direction 100. Space 45 may be any form that allows pinion shaft 50 to rotate in its circumferential direction with pin 71 partially inserted in insertion hole 54 and allows pin 71 and pinion shaft 50 to rotate together.

Furthermore, while the above embodiments have been described for a shaft device by referring by way of example to pinion shaft 50 accommodated in differential casing 40, the device of the present invention is also applicable to other devices. For example, the present shaft device is also applicable to a pinion unit of a planetary gear used for an automatic transmission, a transfer and the like. Furthermore, the present shaft device is applicable not only to vehicular components but also a shaft serving as a plain bearing.

The embodiments of the present invention described above may be combined in configuration, as appropriate. It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

Industrial Applicability

The present invention can be advantageously applied to a shaft device of a differential device mounted in a vehicle, that includes a differential casing and a pinion shaft, in particular.

Reference Signs List

1: differential device; 40: differential casing; 44, 54: insertion hole; 45: space; 50: pinion shaft; 51: pinion gear; 71: pin; 72, 172, 272: indentation; 73, 74: tip; 75: head; 76: body; 77, 78: taper; 79: boundary; 100: axial direction.

The invention claimed is:

1. A shaft device comprising:
a casing;
a shaft accommodated in said casing; and
a pin that limits movement of said shaft in an axial direction,
said casing having a first insertion hole receiving said pin in a direction transverse to said axial direction,
said shaft having a second insertion hole receiving said pin in a direction transverse to said axial direction,
said pin being disposed through both said first insertion hole and said second insertion hole to fix said shaft to said casing relatively, and
said casing further having a space permitting said shaft to rotate in its circumferential direction with said pin inserted through said second insertion hole.

2. The shaft device according to claim 1, wherein said space is formed as said first insertion hole has an internal wall partially recessed in a radial direction orthogonal to said axial direction.

3. The shaft device according to claim 1, wherein:
said pin is inserted in said second insertion hole in a radial direction orthogonal to said axial direction; and
said space has a dimension slightly larger than that of said pin in said axial direction.

4. The shaft device according to claim 3, wherein said pin slides relative to said casing as said shaft rotates in its circumferential direction.

5. The shaft device according to claim 1, wherein:
said shaft is accommodated in a cylindrical accommodation hole formed in said casing; and
said space has an inner diameter larger than a diameter of said accommodation hole.

6. The shaft device according to claim 5, wherein said space is round in geometry, as seen in said axial direction.

7. The shaft device according to claim 6, wherein said space shares a center with said accommodation hole.

8. The shaft device according to claim 7, wherein when a running torque acts on said shaft to rotate said shaft in said circumferential direction with said pin disposed through both said first insertion hole and said second insertion hole, said pin is broken at a position radially outer than said diameter of said accommodation hole.

9. The shaft device according to claim 7, wherein:
said pin has a weak portion smaller in strength than another portion of said pin; and
said weak portion is provided at a position radially outer than said diameter of said accommodation hole with said shaft accommodated in said accommodation hole and said second insertion hole having said pin inserted therein.

10. The shaft device according to claim 9, wherein said weak portion includes an indentation as said pin is machined and thus partially removed.

11. The shaft device according to claim 10, wherein said indentation is formed as said pin has a circumference machined and thus reduced in diameter.

12. The shaft device according to claim 10, wherein said indentation is in a form of a through hole penetrating said pin.

13. The shaft device according to claim 1, wherein:
said casing is a casing of a differential device for a vehicle; and
said shaft is a pinion shaft of said differential device and is configured as an axis corresponding to a center of rotation of a pinion gear of said differential device.

14. The shaft device according to claim 8, wherein:
said pin has a weak portion smaller in strength than another portion of said pin; and
said weak portion is provided at a position radially outer than said diameter of said accommodation hole with said shaft accommodated in said accommodation hole and said second insertion hole having said pin inserted therein.

* * * * *